(12) United States Patent
Powell (10) Patent No.: US 9,305,532 B1
(45) Date of Patent: Apr. 5, 2016

(54) MUSICAL INSTRUMENT CABLE SUPPORT AND POSITIONING DEVICE

(71) Applicant: Curtiss Powell, Easton, PA (US)

(72) Inventor: Curtiss Powell, Easton, PA (US)

( * ) Notice: Subject to any disclaimer, the term of this patent is extended or adjusted under 35 U.S.C. 154(b) by 208 days.

(21) Appl. No.: 14/285,670

(22) Filed: May 23, 2014

(51) Int. Cl.
*G10D 9/00* (2006.01)
*G10H 1/32* (2006.01)
*H02G 11/00* (2006.01)

(52) U.S. Cl.
CPC ............... *G10H 1/32* (2013.01); *H02G 11/006* (2013.01)

(58) Field of Classification Search
CPC ................................ G10H 1/32; H02G 11/006
See application file for complete search history.

(56) References Cited

U.S. PATENT DOCUMENTS

| | | | | | |
|---|---|---|---|---|---|
| 742,890 | A * | 11/1903 | Moore | ................... | H01B 17/22 174/172 |
| 1,960,776 | A * | 5/1934 | Flothow | ................... | B44B 7/00 101/31 |
| 1,979,756 | A * | 11/1934 | McNamee | ......... | H01R 13/6395 174/135 |
| 2,421,286 | A * | 5/1947 | Pyle | ....................... | H01B 17/22 174/173 |
| 2,911,695 | A * | 11/1959 | Knight | ................... | H01B 17/22 174/173 |
| 2,913,791 | A * | 11/1959 | Martin | ............... | H01R 13/6395 174/135 |
| 2,941,029 | A * | 6/1960 | Stoeckel | ................ | H01B 17/22 174/173 |
| 3,664,010 | A * | 5/1972 | D'Agati | ................. | H01B 17/22 174/173 |
| 3,951,504 | A * | 4/1976 | Clark | .................. | H02G 3/0658 439/451 |
| 4,124,154 | A * | 11/1978 | O'Russa | ................ | A01K 65/00 224/103 |
| 4,357,063 | A * | 11/1982 | Gray | .................. | H01R 13/6395 24/132 AA |
| 4,477,948 | A * | 10/1984 | Sachs | ....................... | F16G 11/00 24/115 K |
| 5,113,614 | A * | 5/1992 | Morita | ................. | A01K 91/053 43/42.74 |
| 5,145,399 | A * | 9/1992 | Davenport | ......... | H01R 13/6395 439/367 |
| 5,478,969 | A * | 12/1995 | Cardey, III | ............... | G10H 1/02 84/626 |
| 5,821,458 | A * | 10/1998 | Wenzel | .................... | D06F 75/28 174/651 |
| 6,198,031 | B1 * | 3/2001 | Jones | ..................... | G10D 1/085 224/910 |
| 6,372,984 | B1 * | 4/2002 | Wang | ...................... | H02G 7/14 174/40 TD |
| 6,441,294 | B1 * | 8/2002 | Seli | ........................ | G10H 1/053 84/267 |
| 6,646,208 | B1 * | 11/2003 | Tseng | .................... | H01B 17/22 174/173 |
| 7,004,782 | B2 * | 2/2006 | Kroenung | ............ | H01R 13/639 439/371 |
| 7,052,305 | B2 * | 5/2006 | Kurokawa | .............. | H01R 13/60 439/371 |
| 7,417,184 | B2 * | 8/2008 | Weathersby | ........... | G10D 3/163 84/322 |
| 7,520,473 | B2 * | 4/2009 | Karlinger | ............... | H02G 11/00 174/68.1 |
| 8,215,594 | B1 * | 7/2012 | Rench | ................... | F16G 11/103 248/316.7 |
| 2005/0064752 | A1 * | 3/2005 | Serino | .................. | H01R 13/622 439/320 |
| 2007/0125220 | A1 * | 6/2007 | Taylor | ...................... | G10H 1/32 84/290 |
| 2007/0134973 | A1 * | 6/2007 | Coco | .................. | H01R 13/5833 439/404 |
| 2015/0003784 | A1 * | 1/2015 | Islam | ................... | G02B 6/3887 385/62 |

OTHER PUBLICATIONS

Mastro, J., "Guitar Bar: Make Your Cables Last, Jack!", Guitar World, Nov. 28, 2011, 2 pages.
"Top 5 Most Stupid Things Guitarists Do", http://mb.frankgambale.com/NonCGI/Forum1/HTML/000426.html, Feb. 19, 2002, 10 pages.

* cited by examiner

*Primary Examiner* — Robert W Horn
(74) *Attorney, Agent, or Firm* — Caesar Rivise, PC

(57) ABSTRACT

A cable positioning device for positioning a cable attached to an instrument is provided including a connecting member for affixing the device to the instrument, a spiral member having a first end, a second end, and coils between the first end and the second end. The first end of the spiral member is disposed on the connecting member. The spiral member is for receiving and guiding the cable longitudinally through said spiral member. The spiral member is fabricated from a semi-rigid material providing for flexion when a strain is transferred to the device via the cable, and is positionable by a user of the device. A terminating member disposed on the second end.

9 Claims, 6 Drawing Sheets

MUSICAL INSTRUMENT CABLE SUPPORT AND POSITIONING DEVICE

BACKGROUND OF THE INVENTION

The invention described herein relates generally to the field of musical instrument accessories, and more specifically to a device for use with cables connected to amplified musical instruments, the device: effecting separation between the player of the instrument and the cable connecting the instrument to the amplifying device; increasing the likelihood that the cable remains engaged with the musical instrument; reducing the strain upon the cable and musical instrument created by unintended contact with or movement of the cable; reducing the risk that the player may become entangled in the cable while playing the musical instrument; and thereby provided freedom of movement for the player of the amplified musical instrument.

BACKGROUND

Historically, guitarists have struggled with the issues presented by the proximity to the player's body of the instrument cable connecting the instrument to an amplification device. Primary among these issues is the risk that the player, in the course of moving about an area while playing the instrument, will step on or become entangled in the cable, thereby transferring tension along the cable and in turn to the cable's various members and to the instrument or amplifier connected to the cable. One common resulting issue is disengagement of the cable from the instrument or amplifier, which interrupts the signal chain of the musician and prevents the musician's performance from continuing to be amplified. Another common resulting issue is the creation of undesired strain upon the input jack of the guitar, the point at which the guitar electrically engages with the connecting member of the cable, by the tension placed upon the cable from the unintentional contact with the cable. This type of strain can cause significant damage to the guitar, such as breakage of the input jack itself, cause intermittent interruption of frequencies while playing, as well as potential damage to the cable, including its internal copper wire components or the cable's connecting member. Other similar points of the guitar may receive such undesired and damaging strain, such as the strap button of the guitar.

The longstanding existence of these unsolved issues with limited available solutions are well documented in the prior art. For example, in the Internet forum article dated Feb. 19, 2002, "Top 5 most stupid things guitarists do," which lists " . . . not routing your cable through the strap, and then stepping on it, pulling it out of the guitar." Present methods of reducing the risks described aim primarily to reduce the amount of tension directly transmitted via the instrument cable to the instrument input jack. The most common method comprises the act of the player passing the instrument cable through the guitarist's strap, above the strap button and between the strap and the guitar body, before engaging it with the guitar's input jack in order to permit the strap and the strap button to bear some of the strain created by unintended contact with the cable by the player or another person or object. The problem is discussed in terms of the predominant existing method of addressing it, in the article "Guitar Bar: Make Your Cables Last, Jack!," Nov. 28, 2011, which instructs "[g]et in the habit of looping your cable through the bottom end of your strap, and through the handle of your amp. This little bit of slack will not only help take the tension off where the cable is soldered to the jack; it also will keep you plugged in, should your cable get stepped on and yanked. You will also avoid the possibility of damaging your input jacks or bending the barrel of your jack."

Another proposed method, as shown in products such as Cablecure, produced by Gravity Guitar Innovations, disclosed in U.S. patent application Ser. No. 11/640,406, Coco, Cablecure, A Guitar Accessory, seeks to specify the point that will receive the unintended strain by affixing the cable's slack at a single point on the guitar body. The Cablecure product engages at or near the guitar's strap button and provides a member for looping and affixing the cable. This is similar to the prior art methods taught by U.S. Pat. No. 6,198,031, Jones, Musical Instrument Cable Lock; or U.S. Pat. No. 8,215,594, Rench, Musical Instrument Cable Clip. As with the practice of feeding the cable through the player's strap, products such as those taught by Coco, Jones and Rench act to place the guitar's strap button as the primary recipient of unintended cable strain. This may serve to alleviate some direct strain upon the instrument's input jack. However, such device does not reduce the main risk of the player's unintended contact with the cable because it continues to place the cable in immediate proximity to the player and instrument rather than creating separation between the player and musical instrument and the cable. Additionally, the placement of such device directly upon the strap button, at the guitar's body, preserves a single, non-flexible point of contact that will receive the majority of any strain created by any such unintended contact with the cable. The result may still be that the instrument is damaged, for example by the strap button becoming detached from the instrument in a violent manner, which is also likely to result in the interruption of the player's performance due to the instrument falling from its preferred playing position, and potentially, subsequent disengagement of the cable from the instrument or transfer of the strain to the instrument's input jack—the problem originally sought to be addressed.

Existing methods of reducing the entanglement of and unintended cable contact by the player, such as those described, do not adequately alleviate the likelihood of entanglement of the player with the cable, nor do they effectively reduce the risk of damage to the instrument or cable or disengagement of the cable should the player or another person in proximity to the player step on the cable. These methods also do not prevent the player from tripping over the cable when moving about a playing area.

The need therefore remains for a device that effectively inserts distance between the player of a musical instrument and the cable connecting the musical instrument to an amplifying device, thereby effecting separation between the player of the instrument and the cable connecting the instrument to the amplifying device; increasing the likelihood that the cable remains engaged with the musical instrument and reducing the risk of disengagement of the cable; reducing the strain upon the cable and musical instrument created by unintended contact with or movement of the cable; reducing the risk that the player may become entangled in the cable while playing the musical instrument; and thereby providing freedom of movement for the player of the amplified musical instrument.

All references cited herein are incorporated herein by reference in their entireties.

BRIEF SUMMARY OF THE INVENTION

It is broadly desirable to provide a cable support and guiding device that allows the player of a musical instrument or other instrument (such as a microphone) to move about while playing the instrument, without making unintentional contact with a cable connecting the instrument to an amplifying device and to thereby avoid the player unintentionally unplugging the cable from the instrument, damaging the instrument or cable by stepping on the cable or the player becoming entangled in or tripping over the cable. It is further desirable to maintain engagement of the cable with the instrument and reduce the risk of undue stress or tension on the cable or instrument should the player or another person step on the cable while it is engaged with the instrument.

Specifically, it is contemplated by the present invention to provide a cable support and guiding device that permits the player of an instrument, such as an electric guitar, to move about a stage or other playing area with the instrument cable positioned to be separated from the body of the player, "locked" into its engagement with the instrument and positioned so as to avoid, and maintain avoidance, of undesired resistance upon the cable or instrument.

In an exemplary embodiment of the present invention, a cable positioning device for positioning a cable attached to an instrument is provided which includes a connecting member for affixing the device to the instrument, and a spiral member having a first end, a second end and coils between the first end and the second end. The first end of the spiral member is disposed on the connecting member. The spiral member is for receiving and guiding the cable longitudinally through the spiral member. The spiral member is fabricated from a semi-rigid material providing for flexion when a strain is transferred to the device via the cable. The connecting member is positionable by a user of the device. A terminating member is disposed on the second end of the spiral member.

The connecting member may affix the device to a guitar at a strap button of the guitar. The connecting member may be arranged to permit connection to the guitar by passing a strap button screw of the guitar through said connecting member. The semi-rigid material may be steel, such as stainless steel. The spiral member may be affixed to the connecting member at a welded joint. The spiral member and the terminating member may be an integral, one-piece unit. The connecting member, the spiral member and the terminating member may be an integral, one-piece unit. The spiral member, when in flexion, may exert inward pressure upon the cable to reduce freedom of movement of the cable in the direction of said spiral member's length.

In an alternate exemplary embodiment of the present invention, a cable positioning device for positioning a cable attached to a person is provided. The cable positioning device includes a connecting member for affixing the device to a clip, the clip disposed on the connecting member for affixing the connecting member to an article of clothing or accessory worn by the person, and a spiral member having a first end, a second end and coils between the first end and the second end. The first end of the spiral member is disposed on the connecting member. The spiral member is for receiving and guiding the cable longitudinally through the spiral member. The spiral member is fabricated from a semi-rigid material providing for flexion when a strain is transferred to the device via the cable. The spiral member is positionable by a user of the device. A terminating member is disposed on the second end of the spiral member.

BRIEF DESCRIPTION OF SEVERAL VIEWS OF THE DRAWINGS

The invention will be described in conjunction with the following drawings in which like reference numerals designate like elements and wherein:

FIG. 1b is a front view of a the cable positioning device of FIG. 1a;

FIG. 3a is a perspective view of the cable positioning device of FIG. 1a affixed to a guitar;

FIG. 3b is an enlarged perspective detail view of the cable positioning device of FIG. 1a affixed to a guitar of FIG. 3a, shown at detail A of FIG. 3a;

FIG. 6b is a side view of the cable positioning device of FIG. 6a.

FIG. 6c is a front view of the cable positioning device of FIG. 6a.

DETAILED DESCRIPTION OF THE INVENTION

The invention of the present disclosure is described below with reference to certain embodiments. While these embodiments are set forth in order to provide a thorough and enabling description of the invention, these embodiments are not set forth with the intent to limit the scope of the disclosure. A person of skill in the art will understand that the invention may be practiced in numerous embodiments, of which those detailed here are merely examples. In order to allow for clarity of the disclosure of the claimed invention, structures and functions well known to those skilled in the art are not here disclosed. Those skilled in the art should also realize that equivalent musical instrument cable support and positioning devices do not depart from the spirit and scope of the invention in its broadest form.

Figure 1A:
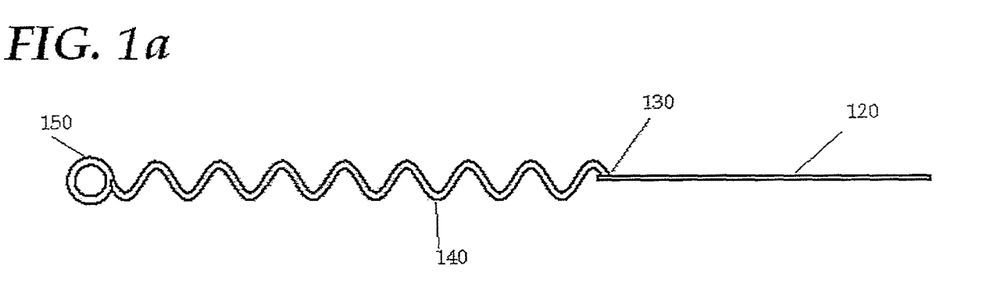
FIG. 1a is a side view of a cable positioning device in accordance with an exemplary embodiment of the present invention.
Figure 1B:
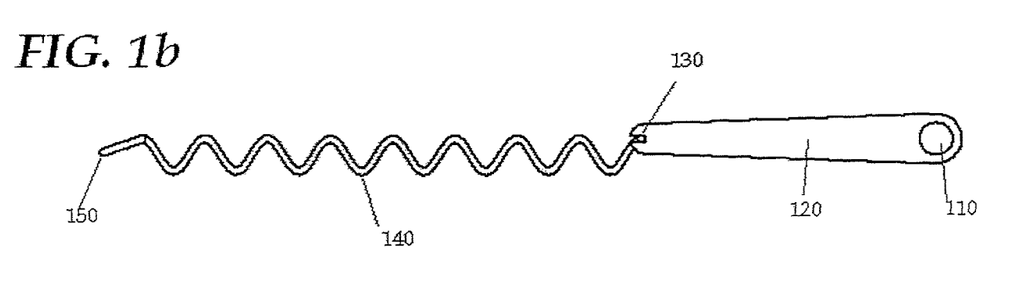
Figure 2:
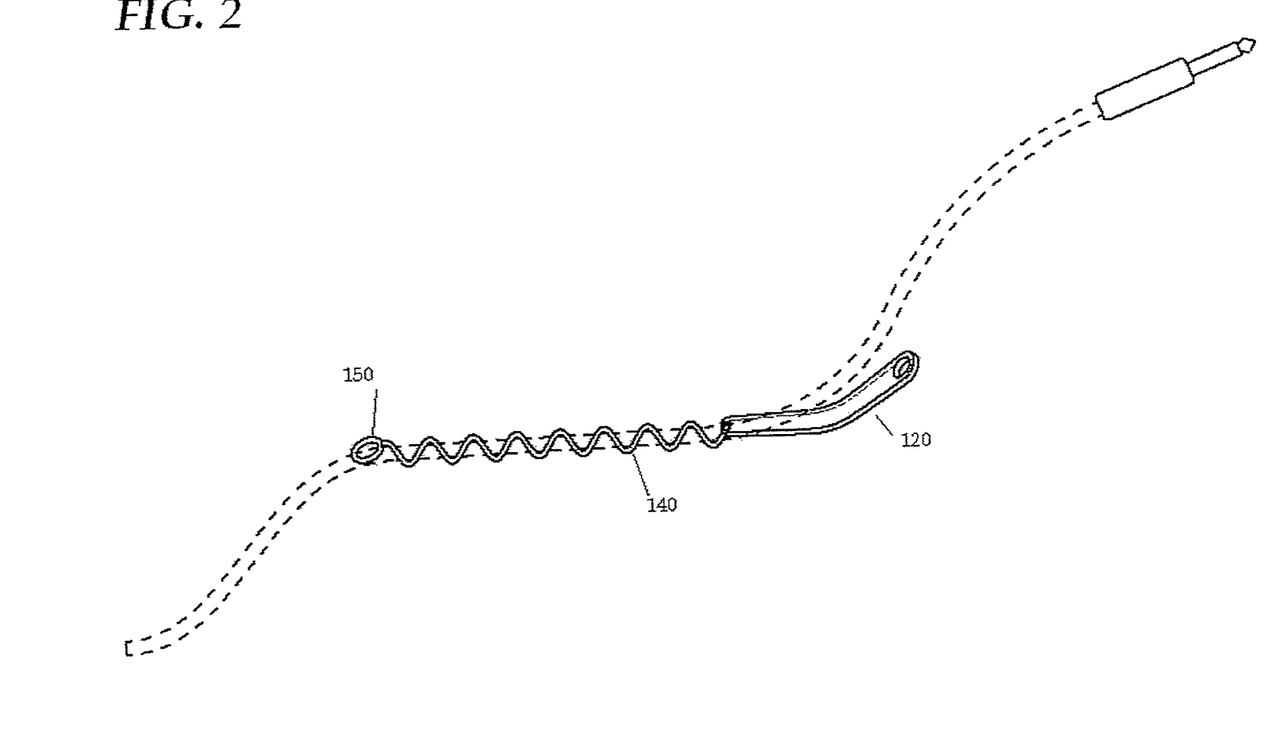
FIG. 2 is a side view of the cable positioning device of FIG. 1a, showing its spiral member with an instrument cable passed through its length.
Figures 3A, 3B:
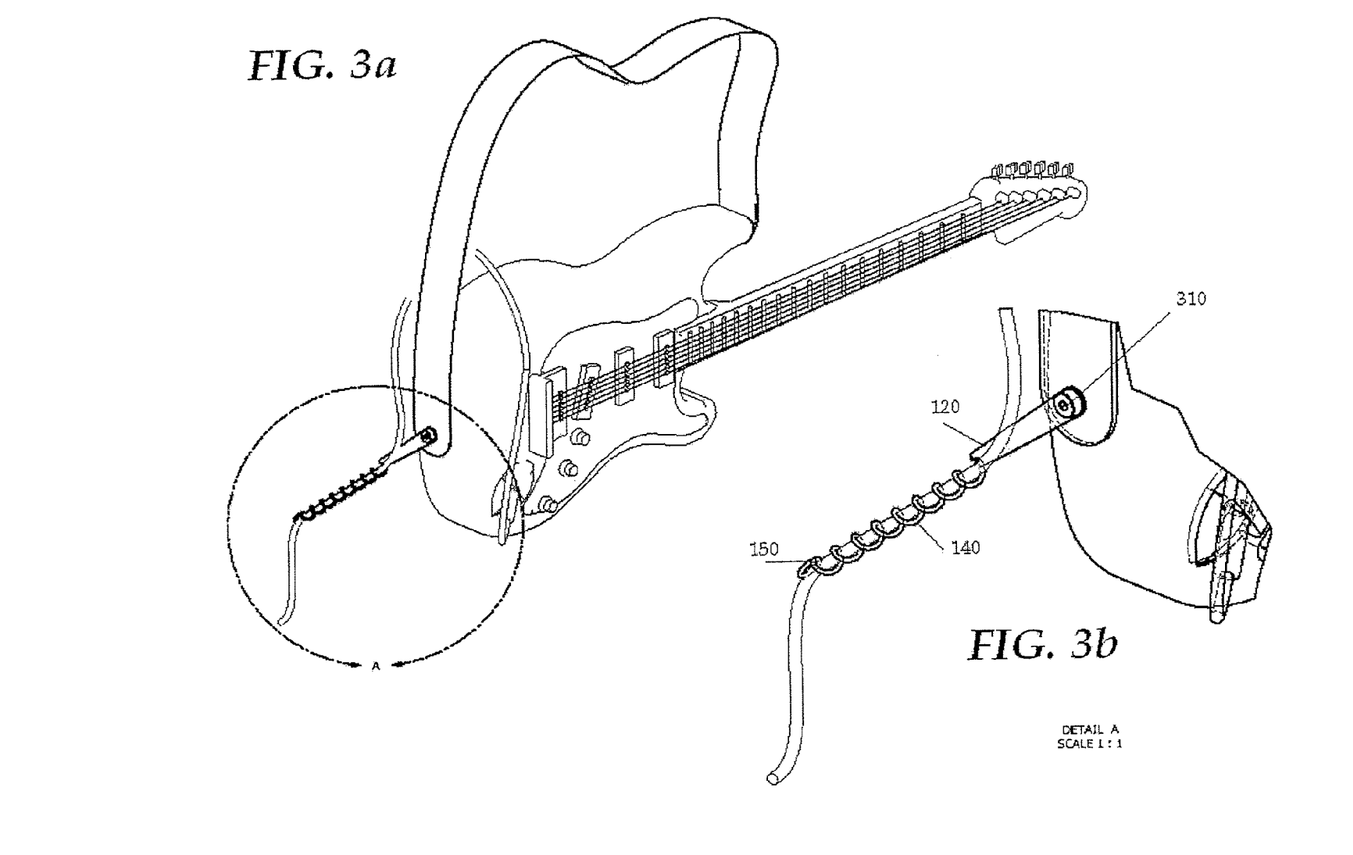

Referring now to the drawings wherein like elements refer to like part numbers throughout the several views, there is shown in FIGS. 1a-5 a cable positioning device in accordance with an exemplary embodiment of the present invention. FIG. 1a is a side view and FIG. 1b is a front view of the cable positioning device. FIG. 1a and FIG. 1b show a connecting member 120 for affixing the device to the body of a guitar or other instrument. The exemplary embodiment of FIG. 1b further shows the connecting member 10 arranged to engage, as shown in FIG. 3b, with the body of the instrument (here, a guitar is shown for clarity) by removing the strap button 310 of the guitar, passing the screw of the strap button through the hole 110 of the connecting member and re-engaging the screw and strap button in order to hold the cable support and positioning device in place. A person of skill in the art would recognize that the hole 110 may also be designed in other ways, such as, for example, having a keyhole shape in certain embodiments to permit the hole to be passed over the strap button 310 without removing the strap button 310, and then allowing the support and positioning device to be engaged and locked in place by pulling the thinner section of the keyhole shape into contact with the strap button 310. The embodiment in FIGS. 1a and 1b further shows a spiral member 140 suitable for accepting a section of an instrument cable within its coils, which cable's audio connector will protrude from one end of the spiral member 140 for the purpose of being connected to the guitar. In the embodiment shown, the audio connector intended to be engaged with the guitar would protrude from a first end of the spiral member 140 that is toward the connecting member 120. In order to facilitate the guidance of the instrument cable to the instrument, the spiral member 140 is connected to the connecting member 120 at the first of the spiral member's length, creating a single point of contact 130 (see FIGS. 1a and 1b). The second end of the spiral member 140 concludes in a terminating member 150. This terminating member 150 is formed to prevent damage to the cable and to avoid damage to other objects or injury to people or things by the end of the spiral member 140, such as might occur if the spiral member were to terminate in a sharp point. As shown in FIG. 2, the greater length of instrument cable engaged with the spiral member 140, leading to the audio connector of the instrument cable intended for engagement with an amplification device, will exit the spiral member 140 at the end of the spiral member's length having the terminating member 150.

In some embodiments, the terminating member 150 may also be formed to permit the connection of further accessories, for example, decorative or fashion accessories such as scarves, novelty items, lighting objects, or the like. The terminating member 150 and the spiral member 140 may also be formed to accept decorative covers, such as in a slip-on design.

In some embodiments of the present invention, the point of contact 130 between the connecting member 120 and the spiral member 140 may be a joint formed by solder or welding, such as when the device is manufactured in component parts of materials such as stainless steel. In other embodiments, the point of contact 130 may exist solely as a transition between segments of a device manufactured as a single, integral unit, such as where the connecting member 120 and the spiral member 140 are cast or fabricated together from materials amenable to such manufacture, such as carbon fiber or other composite materials. In any event, the material of manufacture will permit suitable limited flexion of at least the spiral member 140. This limited flexion serves several purposes.

Figure 4A:
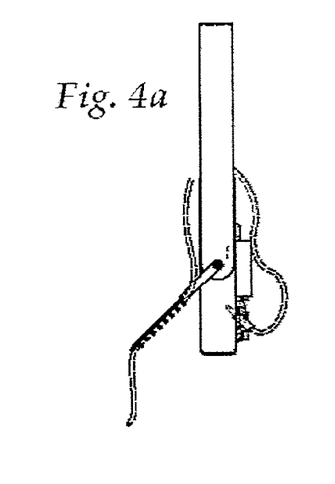
FIG. 4a is front view of the cable positioning device of FIG. 1a affixed to a guitar, showing its spiral member in flexion.
Figures 4B, 4C:
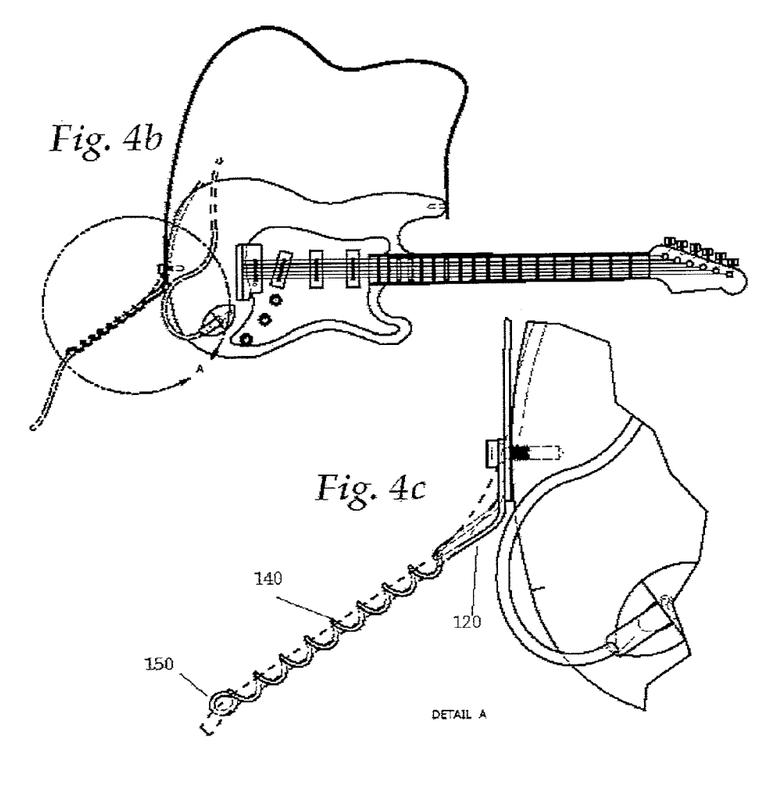
FIG. 4b is a side view of the cable positioning device of FIG. 1a affixed to a guitar, showing its spiral member in flexion
FIG. 4c is an enlarged side, detail view of the cable positioning device of FIG. 1a affixed to a guitar.

As shown in FIGS. 4b and 4c, one first purpose of the limited flexion of the connecting member 120 is to permit the user of the device to position and support the instrument cable in order to achieve separation of the instrument cable from the player's person. This is a key function of the device of the present invention in order to remedy the long known but previously unsolved background issues discussed, including treading upon the cable and entanglement with the cable, which may result in interruption to the player's performance by unintended disengagement of the cable or tripping of the player, damage to the cable, damage to the instrument or unintended disengagement of the player's strap, causing the instrument to fall from its playing position. By flexing and positioning the connecting member 120 the player causes the instrument cable to be guided away from her body in a way that creates an area of free movement around her by extending the instrument cable before it is permitted to hang toward the floor of the playing area. Alternate embodiments of the present invention may permit this positioning of the cable through flexion and positioning of the spiral member 140.

Figure 5:
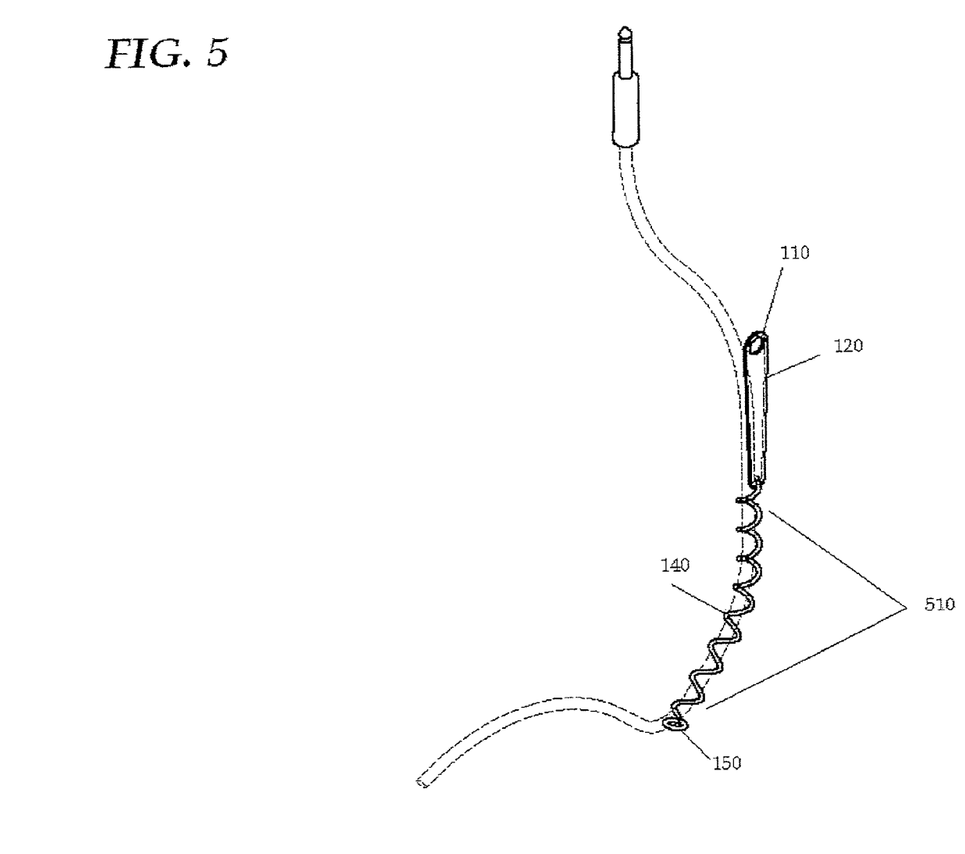
FIG. 5 is a perspective view of cable positioning device of FIG. 1a, showing the spiral member's inward pressure upon a cable passed through the device when tension is transferred to the spiral member via the cable.

While the flexion and positioning of the connecting member 120 extends the cable outside the free movement area of the player, the possibility remains that the player or another person may still step on the instrument cable. The placement of the instrument cable through the spiral member 140 places limited pressure upon the instrument cable. As shown in FIG. 5, should a person step on the cable or the cable otherwise be placed under tension, such as by snagging on a stationary object, the spiral member 140 will be pulled from its chosen position, to flexed position. As FIG. 5 illustrates, in this event, the spiral member 140, by its extension past the desired limited flexion range, will cause the spiral member 140 to extend longitudinally on at least one side 510, thereby exerting inward pressure upon the cable as the spiral member is elongated. This inward pressure will act to lock the instrument cable in place with respect to the spiral member 140. While such increased extension and inward pressure exist, the instrument cable cannot be easily pulled through the length of the spiral member and the audio connector of the instrument cable therefore cannot be disengaged from the instrument as a result of the tension upon the instrument cable. By selection of a material of manufacture having the appropriate elasticity and limited flexion, the spiral member 140 may be returned to its normal length after the cable tension is released. This will permit the device to return to its chosen extended position and to again allow intentional movement of the cable with respect to the spiral member 140, if desired.

Figure 6A:
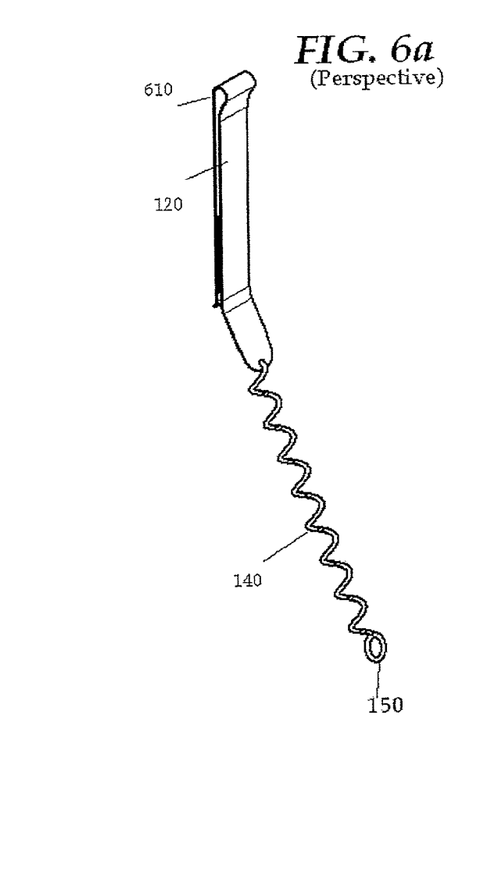
FIG. 6a is a perspective view of a cable positioning device in accordance with a second exemplary embodiment of the present invention, wherein the cable positioning device has a clipping member engaged to the device for connecting the device to an article of clothing or accessory worn by a player of a musical instrument or other user of the device.
Figure 6B:
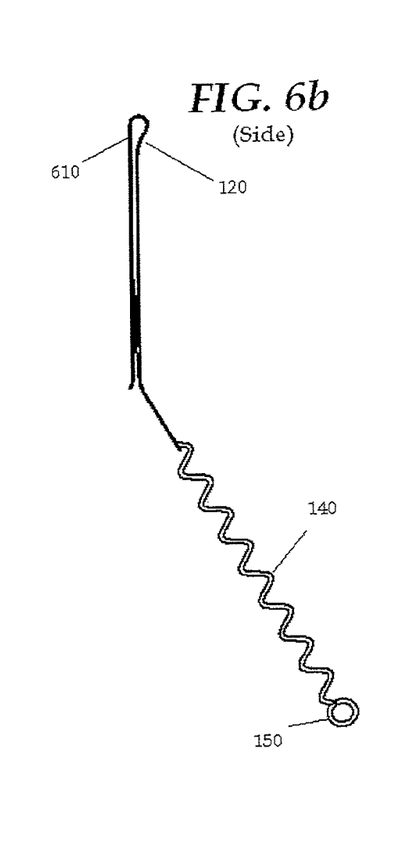
Figure 6C:
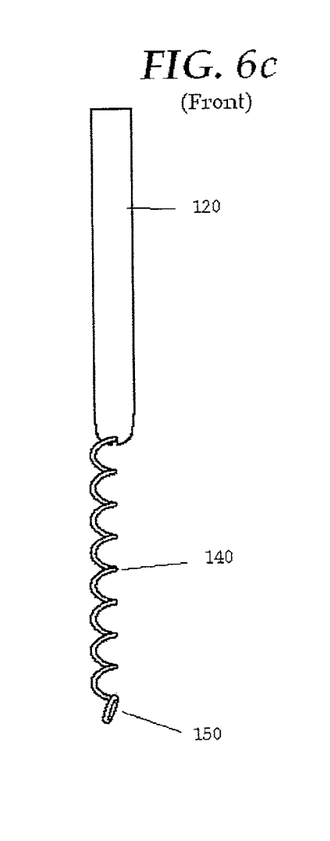

FIGS. 6a, 6b and 6c show an alternate exemplary embodiment of the present invention wherein the connecting means 120 of the device is engaged to or formed in connection to a clip 610 rather than connecting directly to the instrument. This embodiment allows the player to clip the device, via the clip 610, to objects on the player's person, such as his belt, a belt loop or the guitar strap. This allows the player to use the same instance of the disclosed device for multiple instruments without attaching and removing the support and positioning device from each instrument. This also permits the player to use the support and positioning device for instruments where affixing the device to the instrument is not possible or is not desired. The clip 610 and connecting member 120, in some embodiments, may be fastened together to act in accordance with the present disclosure. In other embodiments, the clip 610 and connecting member 120 may be formed of a single piece. One example of the use of the clip 610 may be to pass the audio cable from a handheld microphone through the cable positioning device. In such instance, attaching the device to the microphone may be impractical, however, the creation of a freedom of movement area is still desired and, by use of the cable positioning device in its embodiment with the clip 610, is achieved.

It will be appreciated by persons skilled in the art that numerous variations and/or modifications may be made to the invention as shown in the specific embodiments, without departing from the spirit or scope of the invention as broadly described. Having now fully set forth the exemplary embodiments and certain modifications of the concept underlying the present invention, various other embodiments as well as certain variations and modifications of the embodiments herein shown and described will obviously occur to those skilled in the art upon becoming familiar with the underlying concept. It should be understood that the invention may be practiced otherwise than as specifically set forth herein. The present embodiments are, therefore, to be considered in all respects as illustrative and not restrictive.

What is claimed is:

1. A cable positioning device for positioning a cable attached to an instrument comprising:
   a. a connecting member for affixing the device to the instrument;
   b. a spiral member having a first end, a second end and coils between the first end and the second end, said first end of said spiral member disposed on the connecting member, said spiral member for receiving and guiding the cable longitudinally through said spiral member;
   c. said spiral member fabricated from a semi-rigid material providing for flexion when a strain is transferred to the device via the cable;
   d. said connecting member is positionable by a user of the device; and
   e. a terminating member disposed on the second end of the spiral member.

2. The device of claim 1 where said connecting member affixes the device to a guitar at a strap button of said guitar.

3. The device of claim 2 where said connecting member is arranged to permit connection to the guitar by passing a strap button screw of the guitar through said connecting member.

4. The device of claim 1 where said semi-rigid material is steel.

5. The device of claim 1 where said spiral member is affixed to said connecting member at a welded joint.

6. The device of claim 1 where said spiral member and said terminating member are an integral, one-piece unit.

7. The device of claim 1 where said connecting member, said spiral member and said terminating member are an integral, one-piece unit.

8. A cable positioning device for positioning a cable attached to a person, comprising:
   a. a connecting member for affixing the device to the person;
   b. a clip disposed on the connecting member for affixing the connecting member to an article of clothing or accessory worn by the person;
   c. a spiral member having a first end, a second end and coils between the first end and the second end, said first end of said spiral member disposed on the connecting member, said spiral member for receiving and guiding the cable longitudinally through said spiral member;
   d. said spiral member fabricated from a semi-rigid material providing for flexion when a strain is transferred to the device via the cable;
   e. said spiral member is positionable by a user of the device; and
   f. a terminating member disposed on the second end of the spiral member.

9. The device of claim 1 where said spiral member, when in flexion, exerts inward pressure upon the cable to reduce freedom of movement of the cable in the direction of said spiral member's length.

* * * * *